Feb. 13, 1940.　　　　　D. R. McNEAL　　　　　2,189,814
CIRCULATING SYSTEM AND VALVE FOR CONTROLLING THE SAME
Filed June 26, 1936　　　　3 Sheets-Sheet 1

INVENTOR
Daniel Raymond McNeal
BY
ATTORNEYS

Feb. 13, 1940.     D. R. McNEAL     2,189,814
CIRCULATING SYSTEM AND VALVE FOR CONTROLLING THE SAME
Filed June 26, 1936     3 Sheets-Sheet 2
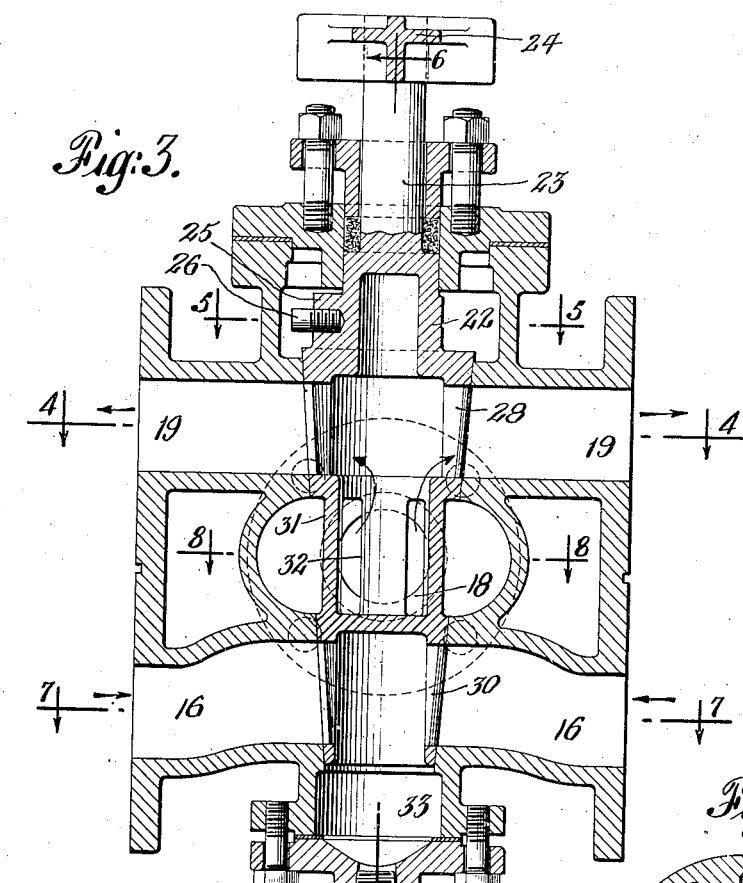
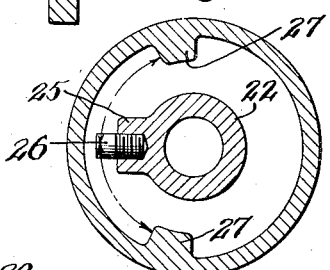
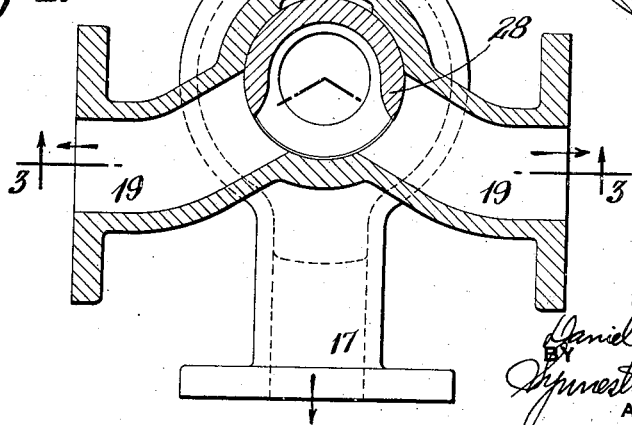
INVENTOR Feb. 13, 1940.  D. R. McNEAL  2,189,814
CIRCULATING SYSTEM AND VALVE FOR CONTROLLING THE SAME
Filed June 26, 1936  3 Sheets—Sheet 3
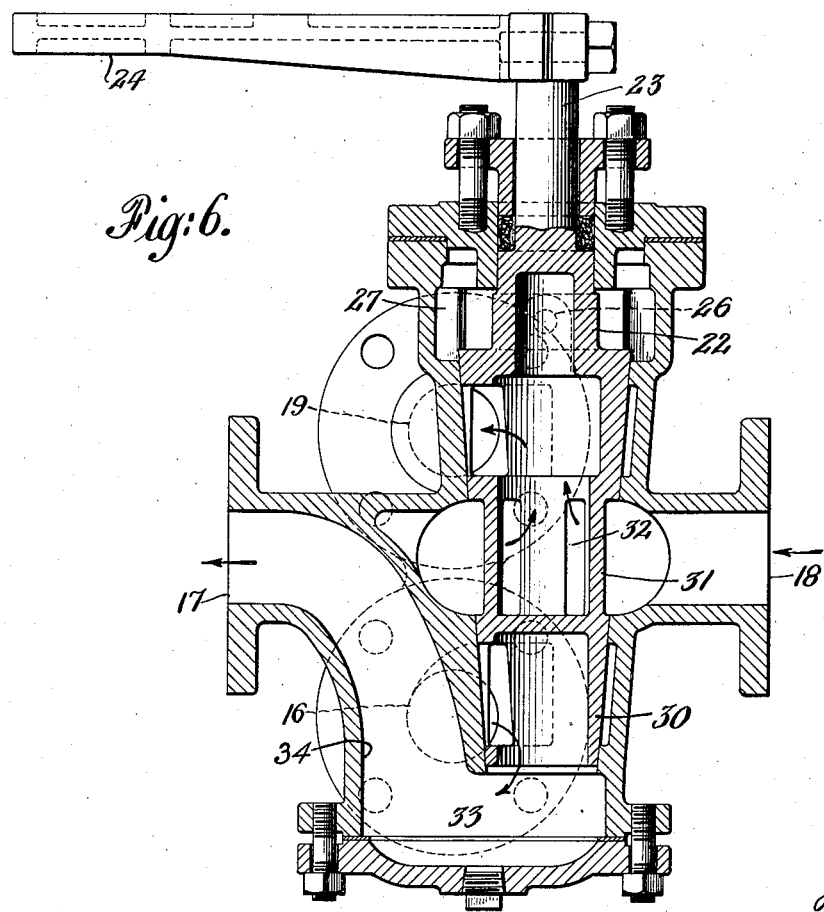
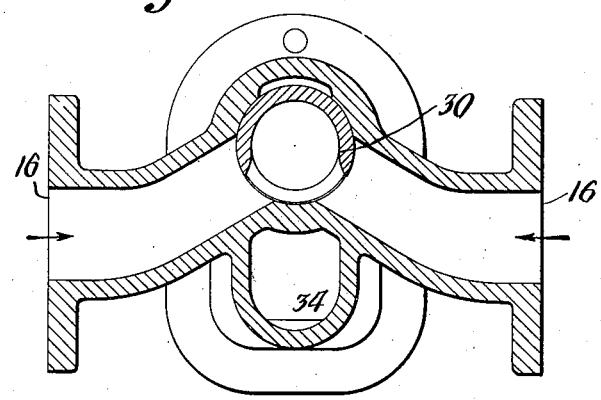
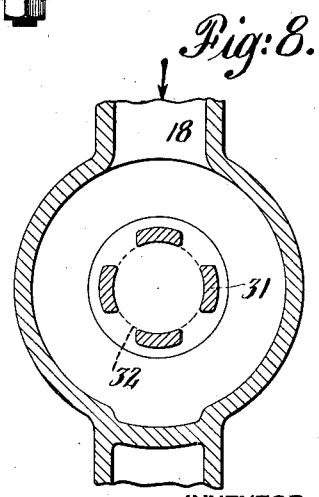
INVENTOR
Daniel Raymond McNeal
BY
Hynestvedt Lechner
ATTORNEYS Patented Feb. 13, 1940

2,189,814

UNITED STATES PATENT OFFICE 2,189,814

CIRCULATING SYSTEM AND VALVE FOR CONTROLLING THE SAME

Daniel Raymond McNeal, Abington, Pa., assignor to Andale Company, Philadelphia, Pa., a corporation of Pennsylvania Application June 26, 1936, Serial No. 87,408

5 Claims. (Cl. 184—6)

This invention relates to a circulating system and control valve therefor which have been developed in connection with and are particularly applicable to a system of lubrication, and the principal object of the invention is to provide a circulating system of the character described in which, at no time, will there be any interruption to the normal flow of the fluid under control while simultaneously making it possible to take a portion of the system out of operation for the purpose of cleaning, repairing or replacing any or all of the parts associated therewith.

More specifically, the invention has been developed in connection with the lubrication of turbine bearings such, for example, as are employed in turbine driven boats or in similar heavy duty, substantially continuously operating power plants.

As is well understood in this art, installations of this kind are frequently operated without interruption for long periods of time, and it is absolutely essential that there be no interruption to the flow of the oil going to the bearings and further that this oil be properly cooled.

Stated in more detail, therefore, it is an object of my invention to provide two or more coolers for supplying oil to the bearings of a turbine or other device requiring a constant supply of properly cooled lubricant together with a common valve for controlling the circulation as between said coolers whereby it is possible to cut out any one cooler entirely or to properly proportion the flow from and to all of the coolers without interfering with the normal flow to the device being lubricated as well as to prevent all possibility of unintentional interruption to the flow of the oil.

How the foregoing objects, together with any other objects which are incident to my invention or which may appear hereinafter, are obtained, is illustrated in preferred form in the accompanying drawings, wherein—

Figure 3 is a vertical section taken on the line 3—3 of Figure 4;

Figure 4 is a horizontal section taken on the line 4—4 of Figure 3;

Figure 5 is a horizontal section taken on the line 5—5 of Figure 3;

Figure 6 is a vertical section taken on the line 6—6 of Figure 3;

Figure 7 is a horizontal section taken on the line 7—7 of Figure 3; and

Figure 8 is a horizontal section taken on the line 8—8 of Figure 3.

Figure 1:
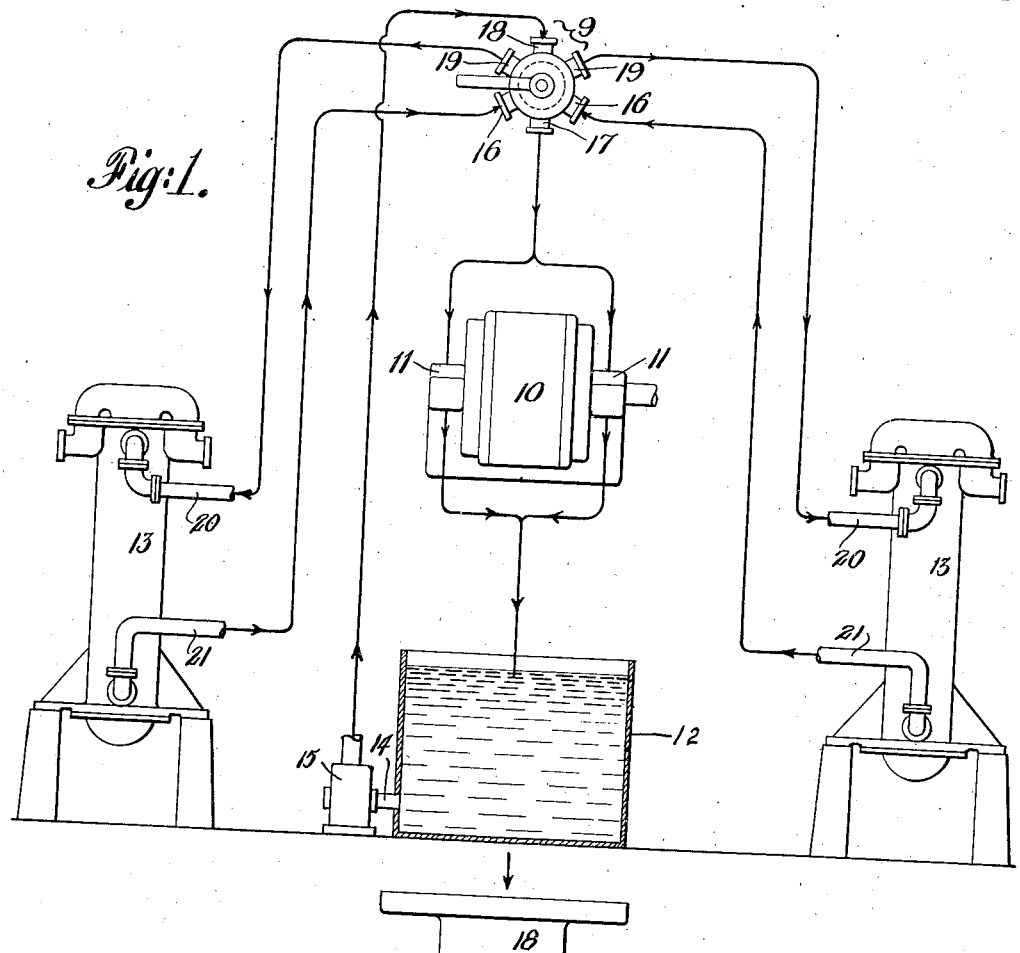
Figure 1 is a schematic diagram (not strictly to scale) illustrating my improved circulating system and the valve for controlling it.

Referring first to the diagram of Figure 1, I wish to point out that the valve 9 shown therein does not strictly conform in general outline to the structure of the valve illustrated in Figures 2 to 8 inclusive for the reason that it was not possible to include the exact structure in the diagram. The diagram, however, is principally for the sake of illustrating the circuits and will be found a convenience in reading the appended claims.

In Figure 1 I have illustrated a turbine 10 having bearings 11 which are to be lubricated by the system now to be described.

There is a sump or reservoir 12 to which the hot oil from the bearings 11 is delivered. The oil is withdrawn from the bottom of this reservoir through the conduit 14 by means of the circulating pump 15, and this pump delivers the oil to an oil inlet 18 in the valve 9, as indicated by the flow lines and arrows in Figure 1.

From the inlet 18 the oil can pass outwardly through either one or both of a pair of outlets 19 and suitable piping 20 to the coolers 13, also as indicated by the flow lines and arrows in Figure 1.

After passing through the coolers, the oil flows back through the pipes 21 to the valve 9, as indicated by the flow lines, entering the valve through the pair of lubricant inlets 16, from whence it can pass to the outlet 17 which delivers to the bearings 11, also as shown by the flow lines and arrows in Figure 1.

The details of the coolers are not fully shown in the present application, since, per se, they form no part of the invention under consideration.

The valve structure is provided with the several connections already described, but attention is directed to the fact that the inlet 18 for receiving the hot oil is associated with a pair of outlets 19, one of which goes to each of the coolers 13. Furthermore, the outlet 17 in the valve which delivers the cooled oil to the bearings 11 is associated with the pair of inlets 16, each of which is suitably connected with one of the coolers 13, as already described.

The valve as a whole is what I term a double circuit plug valve, there being a common plug member 22 for controlling all of the several connections just referred to. This plug valve has an upwardly extending stem portion 23 to which is secured an operating handle 24. The stem is enlarged as at 25 and carries a pin 26 adapted to take against one or the other of the stops 27 (see Figure 5) in the two extreme positions of the valve.

The oil inlet 18 and the pair of oil outlets 19 going to the coolers 13 are controlled by the tapered portion 28, and it will be seen from Figure 4 that this tapered portion 28 is arranged to receive the oil centrally and deliver it laterally to one or the other of the outlets 19 or to both of them in proper proportion, depending upon the position of the valve.

Figure 2:
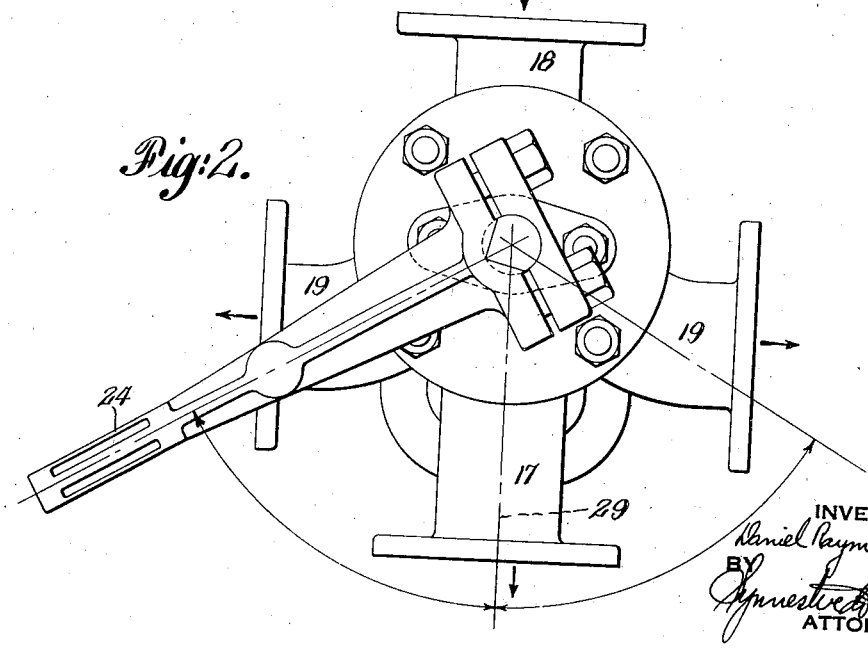
Figure 2 is a plan view of my improved valve.

In Figures 3 to 8 inclusive the valve is illustrated in a mid position such as would correspond to the dot-and-dash line 29 in Figure 2. In Figure 2, however, the operating handle 24 is illustrated in one of its two extreme positions. The arc of travel of the valve is shown by the curved arrows in Figure 2.

The lower end of the plug valve member has a tapered portion 30 which controls the oil outlet 17 and the pair of inlets 16 in a manner exactly similar to that in which the portion 28 controls the inlet 18 and the pair of outlets 19.

Between the two tapered portions the plug valve is provided with a cylindrical portion 31 which is provided with a series of inlet slots 32 which are at all times open to receive the incoming hot oil and deliver it to one or the other of the outlets 19 or to both of them in suitable proportion under the control of the portion 28 as above described.

The oil coming in through the inlets 16 is delivered downwardly through the open end of the bottom of the plug valve into a chamber 33 which delivers through the reverting passage 34 to the outlet 17.

It will be clear from the foregoing that when the valve is turned to one of its extreme positions it will entirely close off one of the pair of outlets 19 leading to the coolers and simultaneously the corresponding inlet 16 coming from the coolers. In its opposite position just the reverse circulation will be established. Furthermore, it is possible to leave the valve in a mid position or in some other position between the two extremes so that the incoming hot oil will be divided and delivered to both of the coolers, while at the same time the cool oil coming in through the inlets 16 will be received in corresponding proportion from each inlet and the combined flow delivered to the outlet 17. This is most clearly shown in Figs. 4 and 7 which illustrate the construction and arrangement of the outlets 19, the inlets 16 and the portions 28 and 30 of the valve member 22. In other words one circuit alone is designed to give the normal or desired flow through the system but when both circuits are in use they are at all times properly proportioned to give a combined capacity which always equals but never exceeds the desired normal flow. It will be seen, therefore, that regardless of the position of the plug valve the full amount of lubricant necessary to adequately lubricate the bearings 11 of the turbine is always free to flow to and from the bearings.

If it ever becomes necessary to clean, repair or replace the parts associated with either of the cooling systems, it is very easy to take such system completely out of operation, and the system is absolutely fool-proof so that, regardless of the position in which the valve may be left, the proper supply of lubricant will always be delivered to the bearings and received from the bearings.

What I claim is:

1. A double circuit valve having a single inlet associated with a pair of outlets and a single outlet associated with a pair of inlets together with a common plug member rotatable to close simultaneously one of said pair of outlets and one of said pair of inlets or to proportionately divide the flow going to said pair of outlets and simultaneously to divide the flow coming in through said pair of inlets, whereby to maintain a constant normal flow from said single inlet to said single outlet.

2. A double circuit valve having a single inlet associated with a pair of outlets and a single outlet associated with a pair of inlets together with a single movable member for controlling all of said inlets and outlets, which member is adapted to entirely close one of said pair of outlets and at the same time one of said pair of inlets while leaving the other outlets and inlets open for passage of a constant normal flow therethrough, or to divide the flow proportionately between said pair of outlets and said pair of inlets so as to maintain said constant normal flow from the single inlet to the single outlet.

3. A valve for use in supplying a constant normal flow of fluid through either or both of two circuits to a common single outlet, said valve having a pair of inlets associated with said common single outlet, a single inlet associated with a pair of outlets, and a common controlling member for controlling all of said inlets and outlets, which member is adapted to entirely close one if said pair of outlets and at the same time one of said pair of inlets while permitting a constant normal flow of fluid to said single outlet or to proportionately divide the flow between said pair of outlets and said pair of inlets so as to maintain said constant normal flow to said single outlet.

4. Equipment for providing a constant normal circulation of lubricant to and from a device to be lubricated including an oil reservoir, a pair of oil coolers and a control valve; said valve having a connection for delivering oil to said device, a connection for receiving oil from said reservoir, a separate connection with each cooler for delivering oil thereto, a separate connection with each cooler for receiving oil therefrom, and a movable valve part adapted to entirely close the connections with either cooler while permitting normal circulation to and from the device through the other cooler or to proportionately divide the flow to and from the two coolers so as to maintain said normal circulation to and from the device.

5. Equipment for providing a constant normal circulation of lubricant to and from a device to be lubricated including an oil reservoir, a plurality of oil coolers and a control valve; said valve having a connection for delivering oil to said device, a connection for receiving oil from said reservoir, a separate connection with each cooler for delivering oil thereto, a separate connection with each cooler for receiving oil therefrom, and a movable valve part adapted to entirely close the connections with any one cooler while permitting normal circulation to and from the device through the other cooler or to proportionately divide the flow to and from all of the coolers so as to maintain said normal circulation to and from the device.

DANIEL RAYMOND McNEAL.